US011886706B2

(12) United States Patent
Darcel

(10) Patent No.: US 11,886,706 B2
(45) Date of Patent: Jan. 30, 2024

(54) METHOD FOR INCREASING THE NUMBER OF APPLICATIONS IN A DEVICE HAVING A LIMITED MEMORY

(71) Applicant: STMicroelectronics (Grand Ouest) SAS, Le Mans (FR)

(72) Inventor: Frederic Darcel, Rennes (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 0 days.

(21) Appl. No.: 17/558,003

(22) Filed: Dec. 21, 2021

(65) Prior Publication Data

US 2022/0206688 A1 Jun. 30, 2022

(30) Foreign Application Priority Data

Dec. 29, 2020 (FR) ...................................... 2014213

(51) Int. Cl.
*G06F 3/06* (2006.01)
*G06F 12/02* (2006.01)

(52) U.S. Cl.
CPC .......... *G06F 3/0608* (2013.01); *G06F 3/0659* (2013.01); *G06F 3/0679* (2013.01); *G06F 12/0238* (2013.01); *G06F 2212/401* (2013.01)

(58) Field of Classification Search
CPC .... G06F 3/0608; G06F 3/0659; G06F 3/0679; G06F 12/0238; G06F 2212/401
See application file for complete search history.

(56) References Cited

U.S. PATENT DOCUMENTS

| | | | |
|---|---|---|---|
| 2013/0326170 A1 | 12/2013 | Kilari et al. | |
| 2016/0124659 A1 | 5/2016 | Oportus Valenzuela et al. | |
| 2017/0090901 A1* | 3/2017 | Bainville | ................ G06F 8/658 |
| 2017/0371595 A1* | 12/2017 | De | ............................. G06F 8/63 |
| 2018/0293028 A1* | 10/2018 | Abali | .................... G06F 3/0679 |
| 2020/0089784 A1* | 3/2020 | Li | ........................ G06F 3/0608 |

* cited by examiner

*Primary Examiner* — Nanci N Wong
(74) *Attorney, Agent, or Firm* — Seed IP Law Group LLP

(57) ABSTRACT

A method includes receiving, by a device, of a control signal identifying a first application from among a plurality of compressed applications stored in a non-volatile memory of the device. The first application is stored in a first location of the non-volatile memory. The device decompresses the first application. The decompressing includes storing the decompressed first application into the non-volatile memory at least partially into the first location, and into a second location storing a second compressed application among the plurality of applications. The decompressed first application overwriting at least a portion of the second compressed application. The method may be performed as part of a customization process of an integrated circuit including the non-volatile memory.

22 Claims, 7 Drawing Sheets

METHOD FOR INCREASING THE NUMBER OF APPLICATIONS IN A DEVICE HAVING A LIMITED MEMORY

BACKGROUND

Technical Field

The present disclosure concerns the field of electronic devices, and in particular a method for the storage of one or a plurality of applications into the memory of an electronic device.

Description of the Related Art

The functionalities of smart cards or of other electronic devices comprising an integrated circuit are often provided by computer programs, or by applications, installed in a memory of the device. These applications are generally loaded with the operating system on installation of the software image of the system. It may be desirable, in certain cases, to store or to load, on manufacturing or production of the device, a plurality of applications into the memory to offer a retailer or a final user the choice of installing or activating one or a plurality of applications according to the provided use, be it in automated payment systems, in identification, in telephony, etc.

However, the memory available on these devices remains limited in size, and loading a large number of applications into the device during the manufacturing thus raises a technical issue.

BRIEF SUMMARY

There is a need for a method and a device which facilitates addressing all or part of the disadvantages of known solutions.

An embodiment provides a method comprising:
the reception, by a device, of a control signal for the selection of a first application among a plurality of compressed applications stored in a non-volatile memory of the device, the first application being stored in a first location; and
the decompression by the device of the first application, and the storage of the first decompressed application into the memory, at least partially:
in the first location; and
in a second location of storage of a second compressed application among the plurality of applications, the first decompressed applications overwriting at least a portion of the second compressed application.

According to an embodiment, the first compressed application comprises a plurality of sections stored at consecutive memory addresses of the first location, and the decompression of the first application comprises:
the decompression of a first section located at least partially at an address next to the location of the second compressed application;
the storage of the first decompressed section at least partially into the location of the second compressed application;
the decompression of a second section of the first application located at least partially at the address next to the first compressed section of the first application; and
the storage of the second decompressed section of the first application on at least one address next to the first decompressed section.

According to an embodiment, the control signal for the selection of the first application to be decompressed contains instructions for the decompression of a subset of the plurality of applications, the size of the subset of decompressed applications being at most equal to the size of the memory where the plurality of compressed applications is stored.

According to an embodiment, the applications of the subset of applications selected by the selection control signal are decompressed by following the order in which they are stored in the non-volatile memory of the device.

According to an embodiment, each compressed application of the selected subset of applications is at least partially stored at an address next to a compressed application which does not belong to the subset.

According to an embodiment, the method comprises:
the reception by the device of another selection control signal comprising instructions for the decompression of another subset of the plurality of applications; and
the generation of an alert signal by the device, the alert signal indicating that the decompression of the other subset is not allowed.

According to an embodiment, the method comprises, before the reception of the selection control signal, the storage of the plurality of compressed applications into the non-volatile memory by a programming device, the selection control signal being transmitted by a selection device.

An embodiment provides a device comprising:
a non-volatile memory; and
a data processing device arranged to:
receive a control signal for the selection of a first application among a plurality of compressed applications stored in the non-volatile memory, the first application being stored in a first location; and
decompress the first application, and store the first decompressed application into the memory at least partially in the first location and in a second location of storage of a second compressed application among the plurality of applications.

According to an embodiment, the non-volatile memory is of a size which does not enable to decompress the plurality of applications.

An embodiment provides an integrated circuit card comprising the described device.

In an embodiment, a method comprises: receiving, by a device, a control signal identifying a first application from among a plurality of compressed applications stored in a non-volatile memory of the device, the first application being stored in a first location; and decompressing, by the device, of the first application. The decompressing includes storing the decompressed first application into the non-volatile memory at least partially: in the first location; and in a second location storing a second compressed application among the plurality of applications, the decompressed first application overwriting at least a portion of the second compressed application.

In an embodiment, a device comprises a non-volatile memory and data processing circuitry coupled to the non-volatile memory. The data processing circuitry, in operation: responds to a control signal identifying a subset of a plurality of compressed applications stored in the non-volatile memory by decompressing a compressed application of the identified subset, the compressed application being stored in a first location of the non-volatile memory, generating a decompressed application. The decompressing of the compressed application includes storing the decompressed application at least partially: into the first location; and into a second location of the non-volatile memory storing another compressed application among the plurality of compressed applications.

In an embodiment, a system comprises an interface and an integrated circuit coupled to the interface. The integrated circuit includes a non-volatile memory storing a plurality of compressed applications in respective locations, and data processing circuitry coupled to the non-volatile memory. The data processing circuitry, in operation, responds to a customization signal identifying a subset of the plurality of compressed applications stored in the non-volatile memory by decompressing the identified subset of compressed applications. The decompressing of a compressed application of the identified subset includes storing the decompressed application at least partially: into the respective location of the compressed application; and into a second location of the non-volatile memory storing a compressed application of the plurality of compressed applications which is not included in the identified subset.

In an embodiment, a non-transitory computer-readable medium's contents cause processing circuitry to perform a method. The method includes identifying a subset of a plurality of compressed applications stored in respective locations of a non-volatile memory of an integrated circuit, and decompressing the identified subset of the plurality of compressed applications. The decompressing of a compressed application of the identified subset includes storing the decompressed application at least partially: into the respective location storing the compressed application; and into a second location of the non-volatile memory storing a compressed application of the plurality of compressed applications which is not included in the identified subset.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures, unless the context indicates otherwise. In particular, the structural and/or functional features that are common among the various embodiments may have the same references and may dispose identical or similar structural, dimensional and material properties.

For the sake of clarity, only the steps and elements that are useful for an understanding of the embodiments described herein have been illustrated and described in detail. In particular, the different compression and decompression algorithms likely to be used have not been detailed, the described embodiments and implementation modes being compatible with usual application compression and decompression algorithms.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and for example, within 5%.

Figure 1:
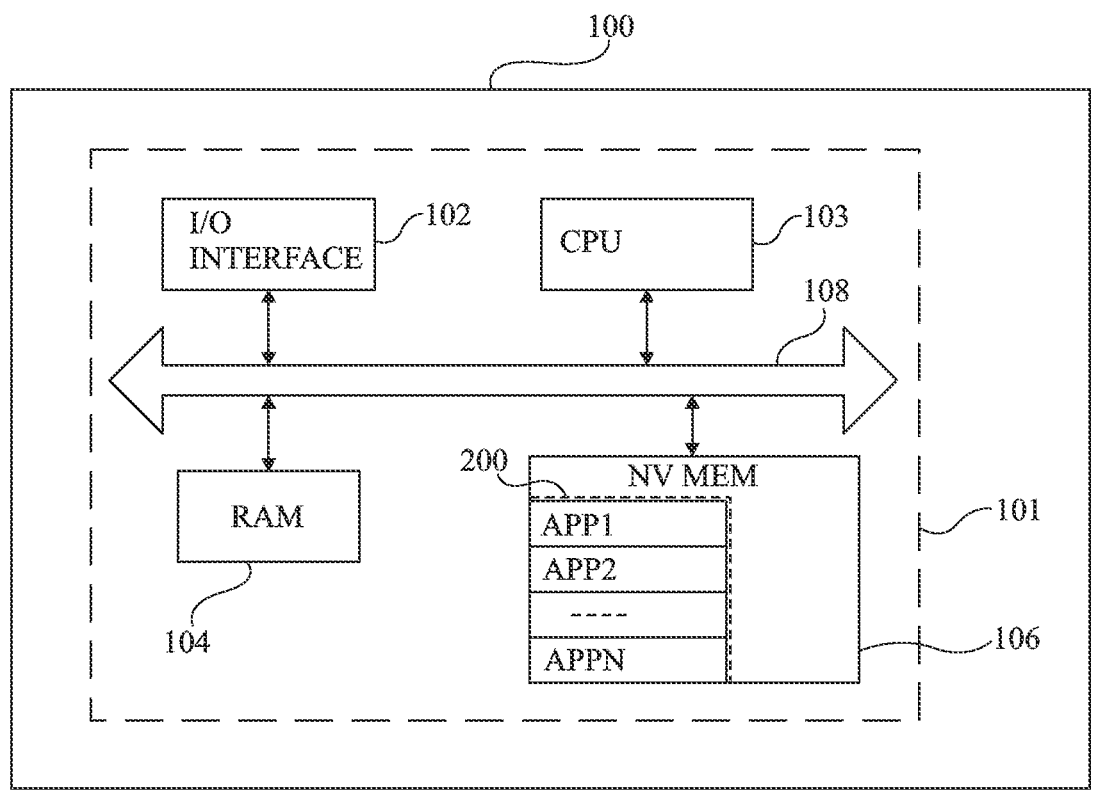
FIG. 1 schematically shows an example of an electronic device.

FIG. 1 schematically shows an example of an electronic device 100 comprising an integrated circuit 101. In certain embodiments, device 100 is an integrated circuit card, such as a bank card, an identification card, or a SIM ("subscriber identity/identification module") card of a cell phone. In other embodiments, this device 100 is a connected device, such as, for example, a connected watch, which for example has a near-field communication (NFC) technology payment application.

Integrated circuit 101 for example comprises at least one input/output interface (I/O INTERFACE) 102, for example comprising a contact (wired) interface and/or a contactless interface. For example, interface 102 comprises a near-field communication interface, such as a NFC interface. Interface 102 is for example coupled via a bus 108 to a processor (CPU) 103, to a memory (RAM) 104, which is for example a random access memory, and to a non-volatile memory (NV MEM) 106, which is for example a FLASH memory. Non-volatile memory 106 contains, at least partly, applications APP 1 to APP N, stored on a space 200 of the memory, where N is the number of applications. For example, N is an integer in the range from two to several tens, for example, from 4 to 10. These applications have been loaded on manufacturing of circuit 101.

Applications APP 1 to APP N for example correspond to applications which have not been installed yet in integrated circuit 101, but which are ready to be installed during an operation of customization of device 100. This operation is for example implemented by an intermediate entity, for example, a retailer, before the acquisition of the device by its final user. In this operation, only applications corresponding to the use for which the device is intended are for example installed. Although it is possible for non-volatile memory 106 to contain no applications before the customization operation and for the desired applications to only be loaded during this customization operation, loading of the applications on manufacturing has advantages. Indeed, for security reasons, it may be desirable for the loading to be performed by the device manufacturer. Further, the manufacturer can also make sure that the application(s) to be installed are compatible with the operating system.

Applications APP 1 to APP N are not intended to all be installed or activated during the device customization operation. The subset of installed applications for example depends on the final use of the device. The memory available on these devices however remains limited, and loading a large number of applications into the device during the manufacturing of integrated circuit 101, to remain flexible regarding the final use of device 100, thus raises a technical issue.

The device 100 shown in FIG. 1 is an example and may of course contain other components than those illustrated in FIG. 1, such as for example other integrated circuits than circuit 101 and which may also each include a processor. According to another example, device 100 also comprises a user interface (not shown). Further, circuit 101 may contain other elements such as for example a direct memory access (DMA) controller.

Figure 2A:
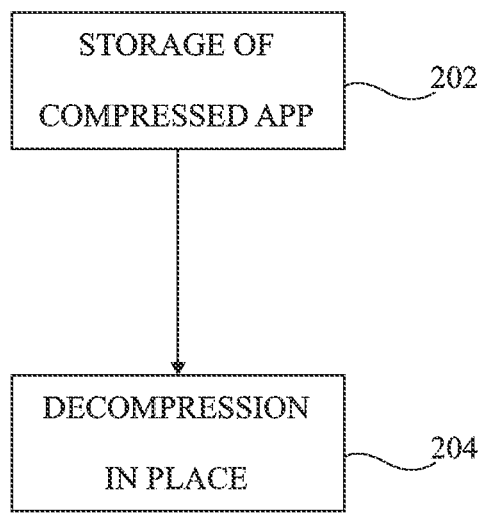
FIG. 2A is a flowchart disclosing operations of a method of installation of applications into an electronic device according to an embodiment of the present disclosure.

FIG. 2A is a flowchart showing operations of a method of installation of applications in an electronic device according to an embodiment of the present description.

In an operation 202 (STORAGE OF COMPRESSED APP), a plurality of compressed applications is stored into the space 200 (FIG. 1) of memory 106.

According to an embodiment, the compression of the plurality of applications is performed outside of integrated circuit 101, for example, on a computing device, such as a computer, external to the integrated circuit. Once the compression operation has been performed, the plurality of compressed applications is loaded to be stored, for example, in space 200 of memory 106.

According to another embodiment, the compression of the plurality of applications is performed directly by integrated circuit 101. For example, the applications are loaded one by one into integrated circuit 101, which itself performs, via processor 103, the compression of the applications one by one, and stores them, still one by one, into memory 106.

In an operation 204 (DECOMPRESSION IN PLACE), a selected subset of applications is decompressed, for example, by an intermediate entity during the customization of device 100. This decompression "in place" corresponds to having the decompression performed by processor 103 with the help of memory 104 based on control signals originating from the outside of the circuit via an input/output interface 102.

According to another embodiment, the execution of the decompression of the applications is performed by passing through memory 104. However, the size of the memory 104 of integrated circuit 101 being generally limited, the decompression of each application may then be performed section by section. In other words, a first section of a first application to be decompressed will first be copied into memory 104, this first section will be decompressed, after which it will be copied into memory 106 before doing the same with a second section of this first application, etc.

Figure 2B:
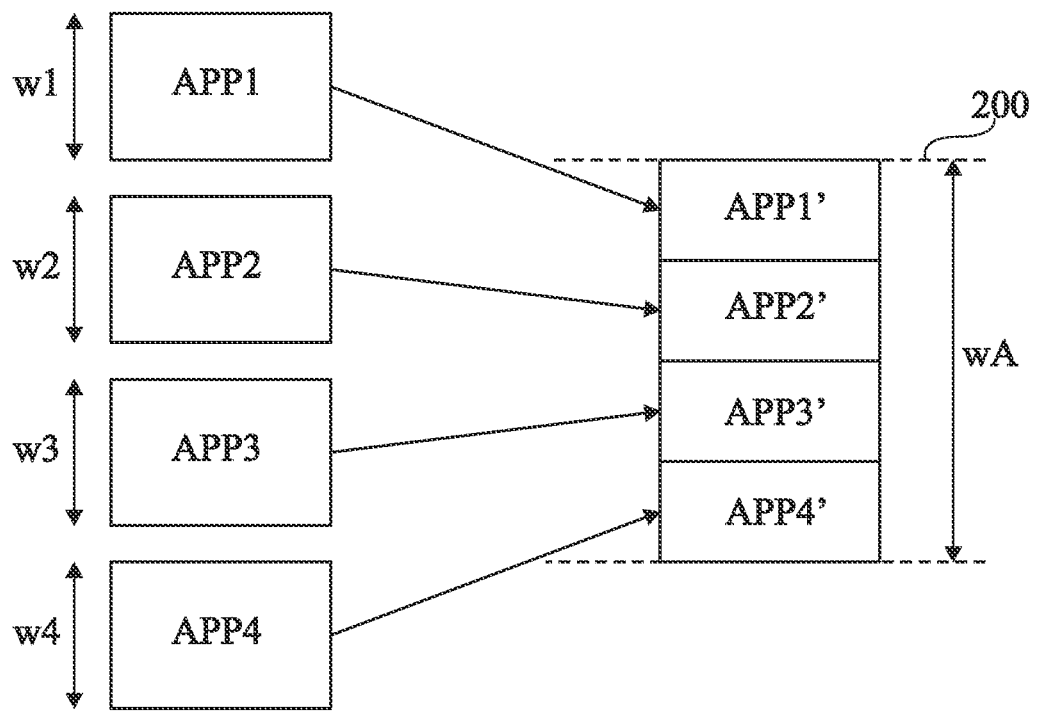
FIG. 2B illustrates an operation of compression of a plurality of applications according to an embodiment of the present disclosure.

FIG. 2B illustrates an example of the operation 202 of compression of a plurality of applications of FIG. 2A.

Storage space 200 has a size wA, for example in the range from a few kilobytes to a few tens of megabytes. Storage space 200 for example represents all, or a portion reserved to the storage of the applications, of the total storage space of non-volatile memory 106. Each application is for example stored into or at consecutive memory addresses of space 200. FIG. 2B illustrates an example of four applications: APP1 to APP4 respectively of size w1 to w4, which are intended to be stored in space 200. The sizes of the four applications are for example such that:

$$w1+w2+w3+w4 \geq wA, \quad \text{Math 1}$$

which does not enable to load the four applications as such into space 200. However, by compressing them according to an adapted compression rate, for example, a compression rate in the range from 30 to 40%, their storage into storage space 200 becomes possible. The sum of the sizes of compressed applications APP1' to APP4', respectively corresponding to applications APP1 to APP4 after the compression, is equal, in this example, to the size wA of storage space 200. In other cases, the sum of the sizes of the compressed applications is smaller than size wA. For example, the compression rate is selected so that a desired number of applications can be stored in a compressed version into space 200 without however for them to be altered after the decompression.

Figure 2C:
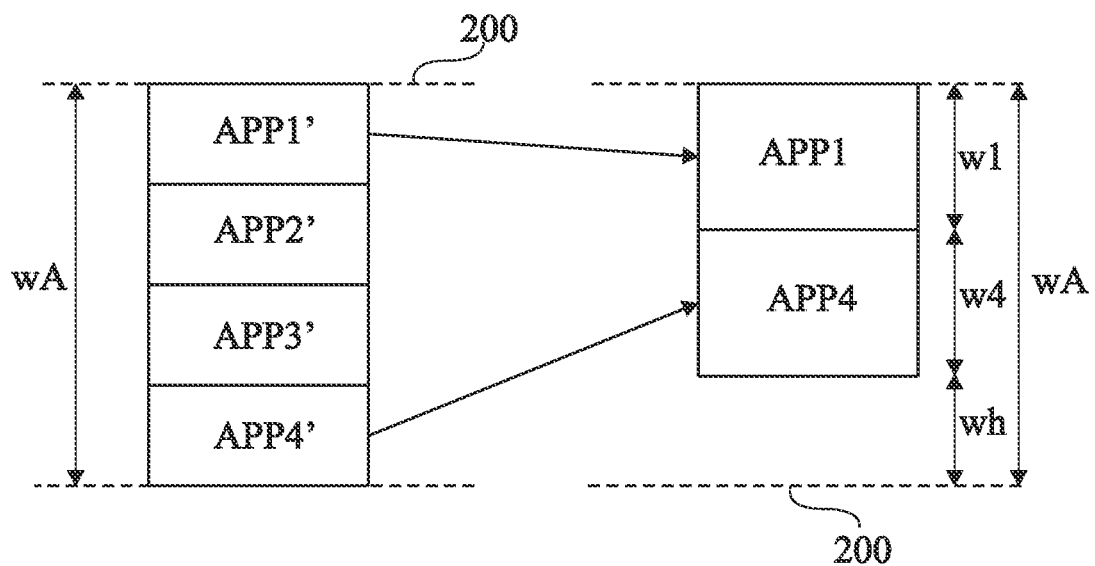
FIG. 2C illustrates an operation of decompression of a plurality of applications according to an embodiment of the present disclosure.

FIG. 2C illustrates an example of the decompression operation 204 of FIG. 2A. This operation is for example performed once the plurality of compressed operations has been loaded into space 200 and, for example, during an operation of customization of the device, outside of the secure environments of the production or manufacturing phase.

Figure 7:
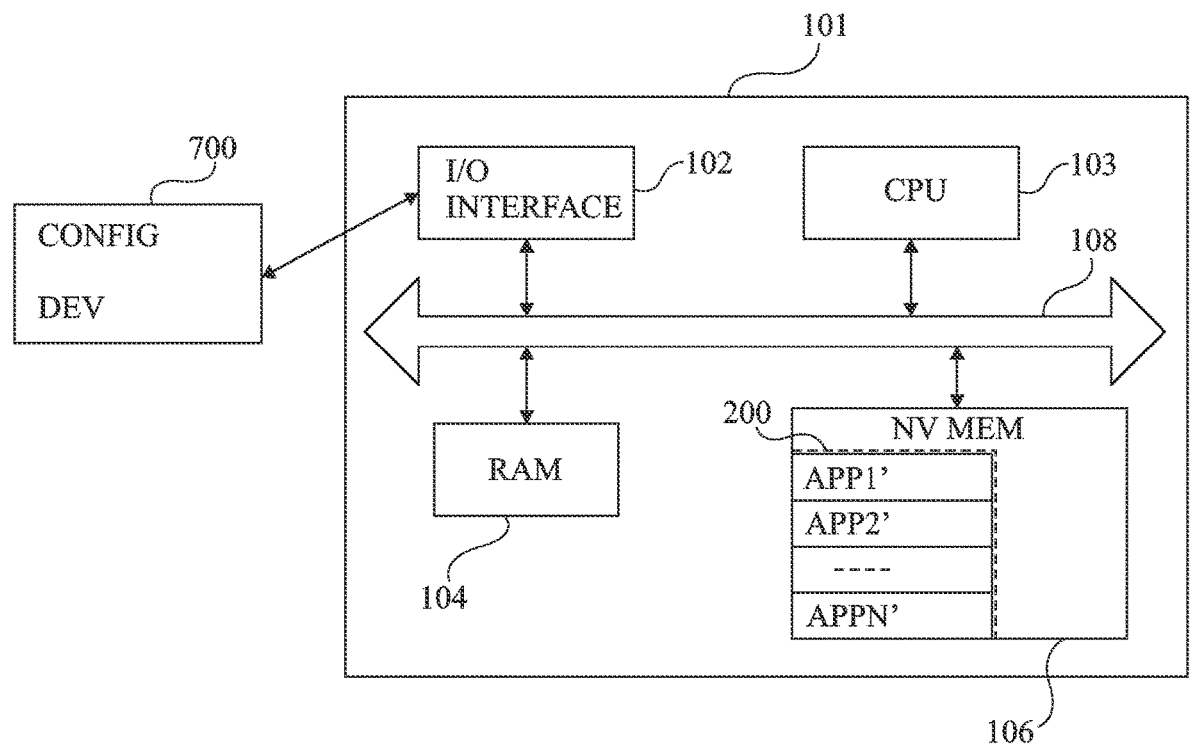
FIG. 7 schematically shows a system comprising an electronic device and a selection device according to an embodiment of the present disclosure.

According to an embodiment, a selection control signal discussed hereafter in relation with FIG. 7 will enable to select a subset of applications from among the plurality of compressed applications in space 200, to be decompressed.

The addresses of space 200 are for example continuous, implying that the memory addresses of space 200 at which the plurality of compressed applications is loaded are consecutive and that each compressed application is stored into real consecutive memory addresses.

According to an embodiment, the compressed applications are stored into space 200 so that each application to be decompressed is stored at memory addresses next to at least one compressed application which will not be decompressed. For example, the applications to be decompressed comprise a plurality of subsets of applications available for an installation, and a selection control signal (described hereafter in relation with FIG. 7) enables to select one of the subsets of applications to be decompressed. Each of the compressed applications in each subset is for example stored at memory addresses next to at least one compressed application of another subset. In the example illustrated in FIG. 2C, applications APP1' and APP4' are selected for the decompression.

According to an embodiment, the decompression of the subset of compressed applications is carried out by increasing storage order. In the example of FIG. 2C, application APP1' is stored into the first memory addresses of space 200 and is thus decompressed before application APP4'. First, application APP1' is decompressed, for example, by an execution "in place," into the memory addresses that it occupies and at least partially into at least a portion of the memory addresses of compressed application APP2'. According to an embodiment, application APP1, once decompressed, is stored into the first consecutive memory addresses of storage space 200. Then, application APP4' is decompressed, for example, by an execution "in place," into the memory addresses next to the decompressed application APP1. In other words, into memory addresses of application APP2' and/or APP3' according to the space occupied by application APP1.

In the example of FIG. 2C, it would also be possible to decompress application APP4' first. Application APP4 would then be stored, for example, at the last addresses of space 200 and application APP1' would then be decompressed and stored at the addresses preceding application APP4.

In the example illustrated in FIG. 2C, the size of decompressed applications APP1 and APP4 is smaller than the size wA of space 200, and a memory region of size wR is left vacant by applications APP1 and APP4:

$$w1+w4<wA \text{ et } wA-(w1+w4)=wR \qquad \text{Math 2}$$

The space which is not occupied by non-decompressed applications (of size wR in the example of FIG. 2C) may be kept as such, that is, occupied by at least a portion of at least one compressed application, it may be overwritten by another application, or be considered as available to be assigned to another need which is not necessarily linked to an application. In the example of FIG. 2C, this space is occupied by a portion of application APP4' which is not executable as such.

Figure 3:
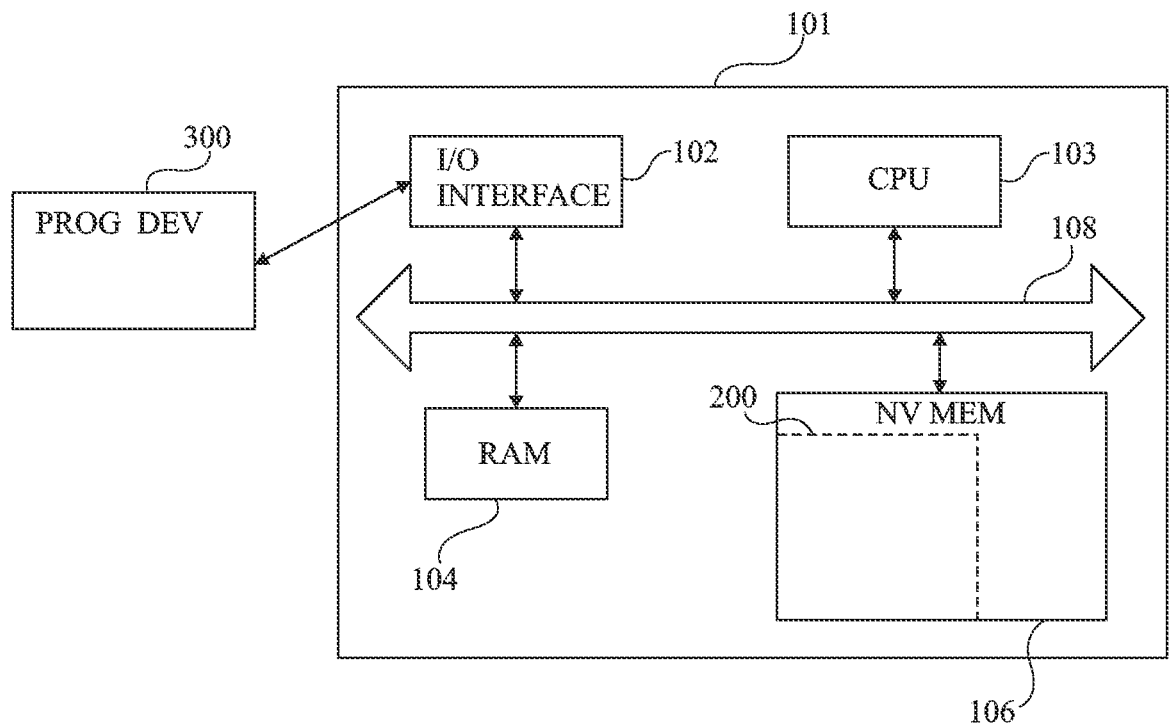
FIG. 3 schematically shows a system comprising an electronic device and a programming device.

FIG. 3 shows a system comprising integrated circuit device 100 and a programming device (PROG DEV) 300. Programming device 300 is configured to implement the operation 202 of FIG. 2A, where the plurality of compressed applications is stored in space 200 of memory 106.

This loading is for example performed in a secure environment. Further, the loading is for example performed during the manufacturing of integrated circuit 101, enabling the manufacturer to ensure, among others, the compatibility of the applications with the chip operating system.

For example, device 300 is a computer which is coupled by wire connection to connection pads of the input/output interface 102 of integrated circuit 101. In another example, device 300 connects to device 100 (FIG. 1) via a near-field communication (NFC), interface 102 comprising in this case at least one antenna and device 300 being a reader allowing the near-field transmission of the plurality of compressed applications.

In the case where the plurality of applications has been previously compressed, it is directly stored into storage space 200. In the case where the plurality of applications is not compressed, the compression is for example executed by processor 103 before the storage into space 200.

Figure 4:
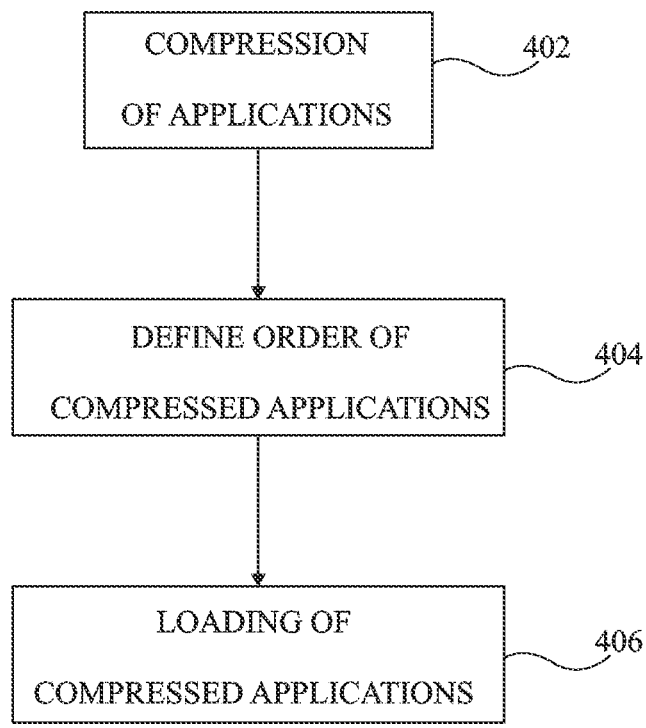
FIG. 4 is a flowchart disclosing operations of a method of loading compressed applications into an electronic device according to an embodiment of the present description.

FIG. 4 is a flowchart showing the operations of a method of loading of compressed applications into an electronic device according to an embodiment of the present disclosure.

At a step 402 (COMPRESSION OF APPLICATIONS), the plurality of applications is compressed. This operation may be directly executed by integrated circuit 101 itself. This operation may also be previously performed on a distinct programming device. In certain cases, it is possible for the plurality of compressed applications to also be encrypted.

At a step 404 (DEFINE ORDER OF COMPRESSED APPLICATIONS), the order of storage of the applications into space 200 is selected to ease the decompression in device 101. For example, a plurality of subsets of applications is defined, each subset being relevant for a final use of device 100. The order of the applications is for example selected so that, for each given subset, each compressed application of the subset is located on addresses next to at least one application of another subset of applications which will not be decompressed.

At a step 406 (LOADING OF COMPRESSED APPLICATIONS), the plurality of applications is stored into space 200 and according to the order defined at step 404.

Figure 5:
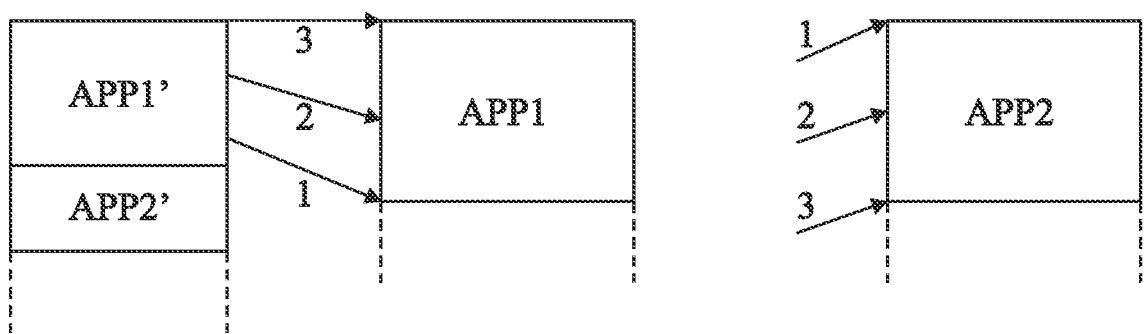
FIG. 5 illustrates an example of the method of decompression of an application according to two examples of selection.

FIG. 5 illustrates an example of the method of decompression of an application according to examples of selection.

For each application selected to be decompressed, the decompression is for example performed by sections. A section is a portion of the application stored in one or a plurality of consecutive memory addresses. For example, a section has a fixed size, corresponding to the size of one or a plurality of memory addresses, each memory address having the size of a word of one or a plurality of bytes. In an example, an application occupying six consecutive memory addresses may be divided into three sections, each occupying two consecutive memory addresses. Since the applications are not all of same size, the number of sections per application may be non-constant. Similarly, it is possible to vary the size of the sections within a same application and/or according to applications.

FIG. 5 illustrates two compressed applications: an application APP1' stored at the first memory addresses of space 200 and an application APP2' stored directly after application APP1'. Each application is divided into three sections (not illustrated in FIG. 5).

The decompression of application APP1' at least partially into the memory addresses occupied by application APP2' is illustrated on the left-hand side of FIG. 5. The decompression is performed "from bottom to top," that is, the third and last section, stored in the last addresses of application APP1', is decompressed first. This decompression is at least partially performed on addresses occupied by application APP2' and without encroaching upon memory addresses occupied by the first two sections of application APP1'. Then, the second section, occupying the memory addresses preceding the last section before the decompression, is decompressed and is stored into the memory addresses directly preceding the third decompressed section. Finally, the first section is decompressed, in the same way as the two others. The size of application APP1 after the decompression being known before the decompression operation, this operation is carried out so that there remains enough space for the storage of the first decompressed section. In certain cases, the first memory address of application APP1 is the first memory address of space 200.

The decompression of application APP2' at least partially into the memory addresses of application APP1' is illustrated on the right-hand side of FIG. 5. The decompression is performed "from top to bottom," that is, the first section stored in the first addresses of application APP1' will be decompressed first. This decompression is performed on the first addresses occupied by application APP1', without encroaching upon memory addresses occupied by the two other sections of application APP2'. Then, the second section, occupying the memory addresses following the first section before the decompression, is decompressed and is stored on the memory addresses directly following the third decompressed section. Finally, the last section is decompressed, in the same way as the two others.

Figure 6:
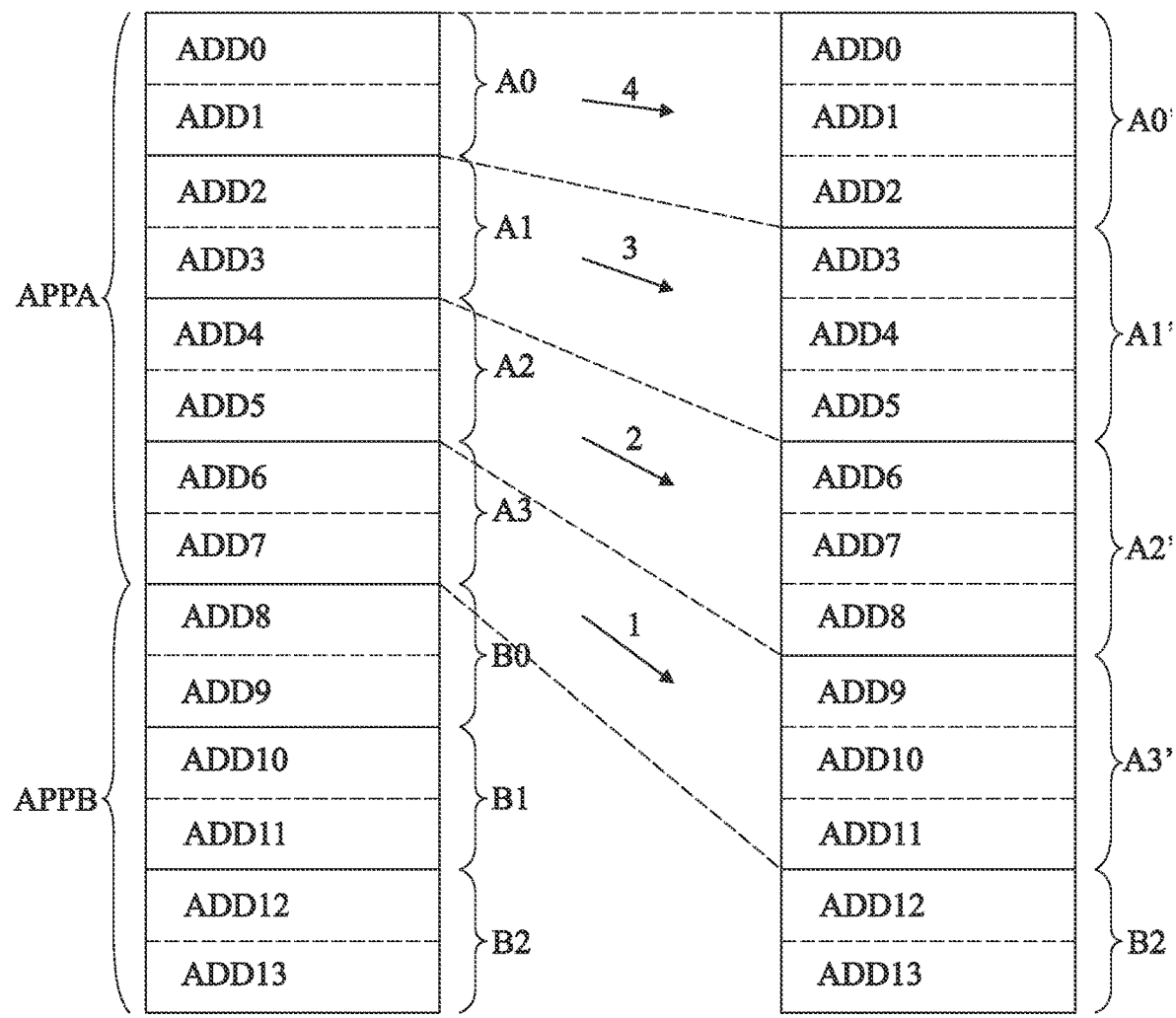
FIG. 6 illustrates in further detail the method of decompression of an application according to one of the examples of selection of FIG. 5.

FIG. 6 illustrates in further detail an example of decompression "from bottom to top.". The example of FIG. 6 shows a first application APPA and a second application APPB. These two applications are compressed and loaded into the consecutive addresses ADD0 to ADD13 of space 200.

Application APPA is formed of four sections A0, A1, A2, and A3 and each section occupies two consecutive memory addresses, in other words, first section A0 occupies addresses ADD0 and ADD1, second section A1 occupies addresses ADD2 and ADD3, and so on. Application APPA is thus stored at addresses ADD0 to ADD7. Application APPB is formed of three sections B0, B1, and B2 each occupying two memory addresses. Sections B0, B1, and B2 are stored at addresses ADD8 to ADD13, each section occupying two memory addresses.

In the example of FIG. 6, application APPB is not decompressed, and application APPA is decompressed and stored, at least partly, into the memory addresses occupied by at least a portion of the sections forming application APPB. Application APPB being stored after application APPA, the decompression of application APPA is performed "from bottom to top," that is, the sections are decompressed by decreasing order of their storage addresses. This decompression order ensures, in the example of FIG. 6 as well as in the example on the left-hand side of FIG. 5, that there is no alteration of the remaining compressed sections of application APPA during the decompression of one of said sections.

The size of application APPA after the decompression is known and an indication of this size is for example stored into memory 106. The decompression rate is, for example, such that each section, after the decompression, will occupy three memory addresses. In other words, after the decompression, application APPA will occupy addresses ADD0 to ADD11. Addresses ADD12 and ADD13 will remain occupied by the last section B2 of the compressed application APP2. This application will no longer be executable, and according to the selected embodiment, it will be appropriate or not to overwrite section B2.

The first section of application APPA which will be decompressed is section A3, which occupies addresses ADD6 and ADD7. Section A3 is decompressed into the last three addresses that the decompressed application APPA will occupy, that is, in this example, into addresses ADD9, ADD10, and ADD11 which are occupied by section B1 and by a portion of section B0. The decompressed section A3 is noted A3' and it occupies memory addresses ADD9, ADD10, and ADD11. According to an embodiment, section A3 is not overwritten and still occupies addresses ADD6 and ADD7. Once this operation has been performed, the previous section is decompressed, in the order of the addresses, that is, section A2. Section A2 is decompressed into a section A2' which occupies the previous addresses next to section A3', that is, the memory addresses ADD6, ADD7, and ADD8 which used to be occupied by the remaining portion of section B0 and by the entire section A3. It is thus proceeded retrospectively until the decompression of section A0 into section A0' which occupies the consecutive memory addresses ADD0, ADD1, and ADD2. The application APPA thus decompressed occupies addresses ADD0 to ADD11 and is formed of four sections A0', A1', A2', and A3', each occupying three memory addresses.

According to other embodiments, it is possible to decompress the applications differently from the example illustrated in FIG. 6. For example, application APPA could be decompressed so that after the decompression it occupies addresses ADD2 to ADD13. Addresses ADD0 and ADD1 would then remain occupied by the compressed section A1.

The order in which the sections of the selected application are decompressed depends on the location of the addresses at which the decompressed application will be stored. As illustrated on the right-hand side of FIG. 5, if the addresses at which the decompression is executed precede the addresses of the compressed application, the application is for example decompressed "from bottom to top." In the case where the addresses at which the decompression is performed follow the addresses of the compressed application, as illustrated on the left-hand side in FIG. 5 as well as in FIG. 6, the application is for example decompressed "from top to bottom."

FIG. 7 schematically shows a system comprising integrated circuit 101 and a selection device or configuration device (CONFIG DEV) 700 used during the decompression operation. During a step of customization of device 100, and for example outside of the secure environment of FIG. 3, selection device 700 transmits to device 100 a decompression control signal indicating the applications to be decompressed. For example, the control signal selects for the decompression a subset from among a plurality of subsets of applications. This transmission control is performed via input/output interface (I/O INTERFACE) 102. The decompression control signal is then communicated, over bus 108, to processor (CPU) 103 to be processed.

As a variant, an implicit decompression (as opposed to the explicit decompression described at the previous paragraph) may be provided when an application is accessed for the first time.

Non-volatile memory 106 contains compressed applications APP1' to APPN' stored in space 200. The decompression of the concerned applications is for example executed by processor (CPU) 103 and may, according to an embodiment, be executed by sections or, in another embodiment, be executed by using memory 104 (RAM).

Figure 8:
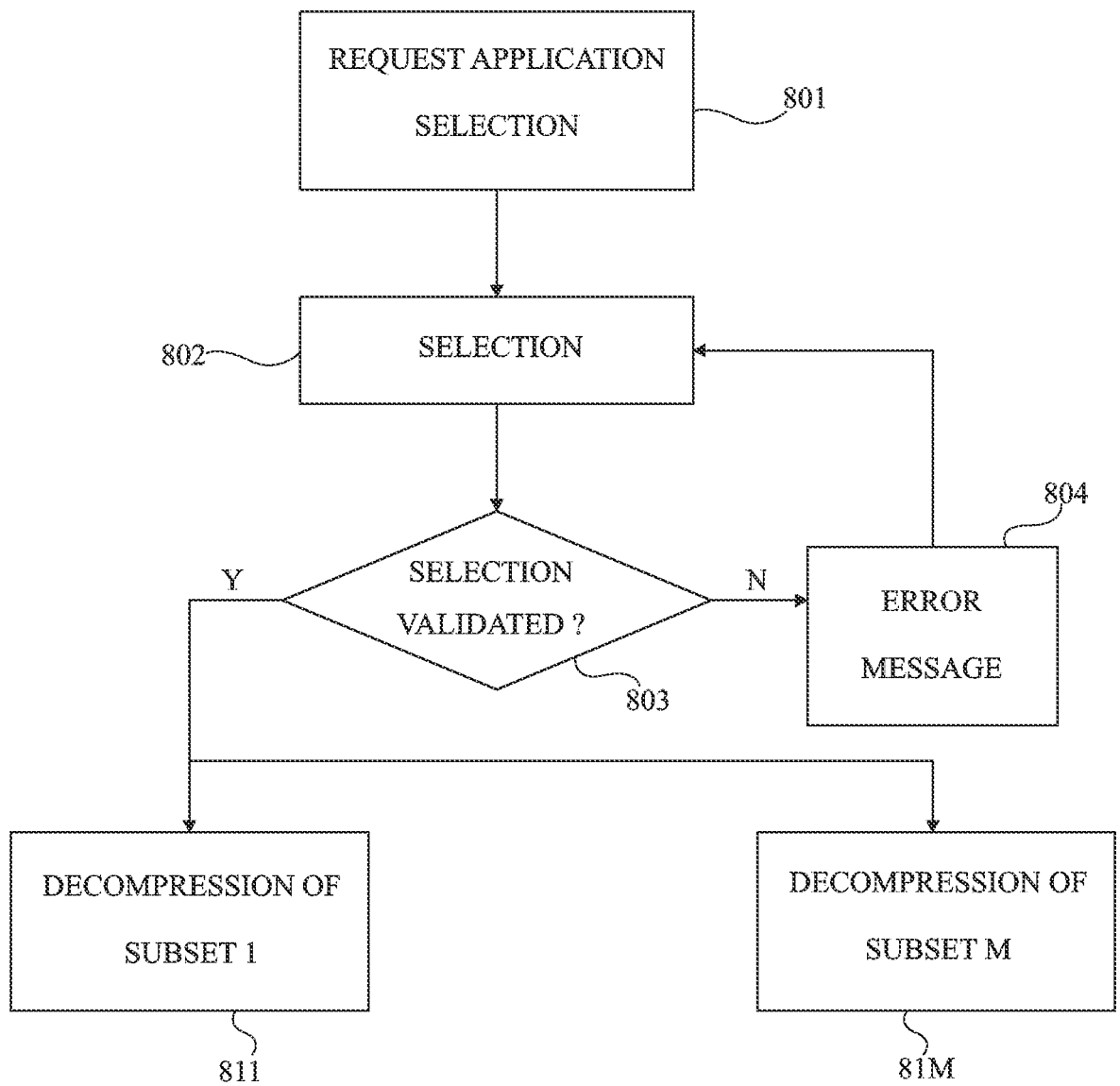
FIG. 8 is a timing diagram showing operations of a decompression method according to an embodiment of the present disclosure.

FIG. 8 is a flowchart showing the steps of the decompression method according to an embodiment of the present disclosure. This method is for example carried out by the system of FIG. 7, once a communication interface has been established between integrated circuit 101 and selection device 700.

In an operation 801 (REQUEST APPLICATION SELECTION), selection device 700 prompts a user to perform a selection of applications to be decompressed. This invitation is for example communicated through the opening of a dialog box on a display of selection device 700, or on a screen connected to selection device 700. An automatic execution by means of a request originating from an external server may also be provided, with no interaction with a user interface. In certain embodiments, operation 801 may be omitted.

In an operation 802 (SELECTION), a control signal for selecting the applications to be decompressed is transmitted from the selection device to integrated circuit 101. For example, the control signal is generated based on a selection performed by the user. In the example illustrated in FIG. 8, the selection is performed from among M subsets of applications. For example, the selection of a subset 1 is performed for an electronic payment use of device 100 while the selection of a subset 2 is performed for a telephone use, etc.

In an operation 803 (SELECTION VALIDATED?), device 700 verifies that the selection performed in operation 802 is valid. For example, the selection cannot be valid if the sum of the sizes of the selected applications after the decompression is greater than the size wA of space 200. In the case where the selection is not valid (N), in an operation 804 (ERROR MESSAGE), device 700 notifies it to the user by an error message, for example, by opening a window, and the method resumes with selection operation 802 (SELECTION).

In the case where the selection performed by operation 802 is validated by operation 803 (Y), the subset of selected applications is decompressed. For example, if subset 1 has been selected, the corresponding applications are decompressed in an operation 811 (DECOMPRESSION OF SUBSET 1). If subset M has been selected, the corresponding applications are decompressed in an operation 81M (DECOMPRESSION OF SUBSET M).

According to an embodiment, the subsets of applications intended for a specific final use of device 100 are already programmed in device 700 and it is sufficient for the user, or other selection means, to select the desired use.

An advantage of the described embodiments is that they enable to store a larger number of applications in a memory of a device to provide a retailer or a final user of the device with a selection of applications according to the provided use.

Various embodiments and variants have been described. Those skilled in the art will understand that certain features of these various embodiments and variants may be combined, and other variants will occur to those skilled in the art. Further, it will readily occur to those skilled in the art that the order of decompression of the applications may be achieved in different ways although examples of decompression on directly neighboring applications have been given.

Finally, the practical implementation of the described embodiments and variants is within the abilities of those skilled in the art based on the functional indications given hereabove.

A method may be summarized as including the reception, by a device (100), of a control signal for the selection of a first application from among a plurality of compressed applications stored in a non-volatile memory (106) of the device, the first application being stored in a first location; and the decompression by the device (100) of the first application, and the storage of the first decompressed application into the memory (106) at least partially in the first location; and in a second location of storage of a second compressed application among the plurality of applications, the first decompressed applications overwriting at least a portion of the second compressed application.

The first compressed application comprises a plurality of sections stored at consecutive memory addresses of the first location, and wherein the decompression of the first application may include the decompression of a first section located at least partially at an address next to the location of the second compressed application; the storage of the first decompressed section at least partially into the location of the second compressed application; the decompression of a second section of the first application located at least partially at the address next to the first compressed section of the first application; and the storage of the second decompressed section of the first application on at least one address next to the first decompressed section.

The control signal for the selection of the first application to be decompressed may contain instructions for the decompression of a subset of the plurality of applications, the size of the subset of decompressed applications being at most equal to the size of the memory where the plurality of compressed applications is stored.

The applications of the subset of applications selected by the selection control may be decompressed by following the order in which they are stored into the non-volatile memory (106) of the device (100).

Each compressed application of the selected subset of applications may be at least partially stored at an address next to a compressed application which does not belong to the subset.

The method may include the reception by the device (100) of another selection control signal including instructions for the decompression of another subset of the plurality of applications; and the generation of an alert signal by the device, the alert signal indicating that the decompression of the other subset is not allowed.

The method may include, before the reception of the selection control signal, the storage of the plurality of compressed applications into the non-volatile memory (106) by a programming device (300), the selection control signal being transmitted by a selection device (700).

A device may be summarized as including a non-volatile memory (106); and a data processing device (103) arranged to receive a control signal for the selection of a first application from among a plurality of compressed applications stored in the non-volatile memory (106), the first application being stored in a first location; and decompressing the first application, and storing the first decompressed application into the memory (106) at least partially into the first location and into a second location of storage of a second compressed application among the plurality of applications.

The non-volatile memory (106) may have a size which does not enable to decompress the plurality of applications.

An integrated circuit card may include the device.

In an embodiment, a method comprises: receiving, by a device, a control signal identifying a first application from among a plurality of compressed applications stored in a non-volatile memory of the device, the first application being stored in a first location; and decompressing, by the device, of the first application. The decompressing includes storing the decompressed first application into the non-volatile memory at least partially: in the first location; and in a second location storing a second compressed application among the plurality of applications, the decompressed first application overwriting at least a portion of the second compressed application. In an embodiment, the first compressed application comprises a plurality of sections stored at consecutive memory addresses of the first location, and wherein the decompression of the first application includes: decompressing a first section located at least partially at an address next to the location of the second compressed application; storing the decompressed first section at least partially into the second location storing the second compressed application; decompressing a second section of the first application located at least partially at an address next to the first compressed section of the first application; and storing the decompressed second section of the first application into at least one address next to the decompressed first section. In an embodiment, the control signal identifies a subset of the plurality of compressed applications to be decompressed, the decompressed size of the identified subset of the plurality of compressed applications being at most equal to the size of the memory where the plurality of compressed applications are stored. In an embodiment, the method comprises decompressing the identified subset of compressed applications in an order in which the identified subset of compressed applications are stored in the non-volatile memory of the device. In an embodiment, each compressed application of the identified subset of compressed applications is at least partially stored at an address next to a compressed application which does not belong to the identified subset. In an embodiment, the method comprises: receiving, by the device of another control signal identifying another subset of the plurality of compressed applications to be decompressed; determining whether decompression of the another subset of the plurality of compressed applications is allowed; and in response to the determination indicating decompression of the another subset of the plurality of compressed applications is not allowed, generating, by the device, of an alert signal indicating the decompression of the another subset is not allowed. In an embodiment, the method comprises: storing, under control of a programming device, the plurality of compressed applications into the non-volatile memory; and subsequently receiving, by the device, the control signal, the control signal being transmitted by a configuring device. In an embodiment, the device comprises an integrated circuit including the non-volatile memory; and the decompressing is performed during a customization of the integrated circuit.

In an embodiment, a device comprises: a non-volatile memory; and data processing circuitry coupled to the non-volatile memory, wherein the data processing circuitry, in operation: responds to a control signal identifying a subset of a plurality of compressed applications stored in the non-volatile memory by decompressing a compressed application of the identified subset, the compressed application being stored in a first location of the non-volatile memory, generating a decompressed application, wherein the decompressing of the compressed application includes storing the decompressed application at least partially: into the first location; and into a second location of the non-volatile memory storing another compressed application among the plurality of compressed applications. In an embodiment, a size of the non-volatile memory is less than a decompressed size of the plurality of compressed applications. In an embodiment, the compressed application comprises a plurality of sections stored at consecutive memory addresses of the first location, and wherein the processing circuitry, in operation, decompresses the compressed application by: decompressing a first section located at least partially at an address next to the location of the another compressed application; storing the decompressed first section at least partially into the second location storing the another compressed application; decompressing a second section of the compressed application located at least partially at an address next to the first compressed section of the compressed application; and storing the decompressed second section of the compressed application into at least one address next to the decompressed first section. In an embodiment, the subset includes two or more compressed applications of the plurality of compressed applications and the decompressed size of the identified subset of the plurality of compressed applications is at most equal to a size of a portion of the non-volatile memory where the plurality of compressed applications are stored. In an embodiment, the data processing circuitry, in operation, decompresses the identified subset of compressed applications based on an order in which the identified subset of compressed applications are stored in the non-volatile memory of the device. In an embodiment, each compressed application of the identified subset of compressed applications is at least partially stored at an address next to a compressed application of the plurality of compressed applications which does not belong to the identified subset. In an embodiment, the data processing circuitry, in operation: responds to another control signal identifying another subset of the plurality of compressed applications to be decompressed by determining whether decompression of the another subset of the plurality of compressed applications is allowed; and responds to the determining indicating decompression of the another subset of the plurality of compressed applications is not allowed by generating an alert signal indicating the decompression of the another subset is not allowed. In an embodiment, the device comprises an integrated circuit including the non-volatile memory and the data processing circuitry, wherein the data processing circuitry performs the decompressing as part of a process of customizing the integrated circuit.

In an embodiment, a system comprises: an interface; and an integrated circuit coupled to the interface, the integrated circuit including: a non-volatile memory storing a plurality of compressed applications in respective locations; and data processing circuitry coupled to the non-volatile memory, wherein the data processing circuitry, in operation, responds to a customization signal identifying a subset of the plurality of compressed applications stored in the non-volatile memory by decompressing the identified subset of compressed applications, wherein the decompressing of a compressed application of the identified subset includes storing the decompressed application at least partially: into the respective location of the compressed application; and into a second location of the non-volatile memory storing a compressed application of the plurality of compressed applications which is not included in the identified subset. In an embodiment, a size of the non-volatile memory is less than a decompressed size of the plurality of compressed applications. In an embodiment, the data processing circuitry, in operation: responds to a second customization signal identifying a second subset of the plurality of compressed applications to be decompressed by determining whether decompression of the second subset of the plurality of compressed applications is allowed; and responds to the determining indicating decompression of the second subset of the plurality of compressed applications is not allowed by generating an alert signal.

In an embodiment, a non-transitory computer-readable medium's contents cause processing circuitry to perform a method, the method comprising: identifying a subset of a plurality of compressed applications stored in respective locations of a non-volatile memory of an integrated circuit; and decompressing the identified subset of the plurality of compressed applications, wherein the decompressing of a compressed application of the identified subset includes storing the decompressed application at least partially: into the respective location storing the compressed application; and into a second location of the non-volatile memory storing a compressed application of the plurality of compressed applications which is not included in the identified subset. In an embodiment, the contents comprise instructions executed by the processing circuitry. In an embodiment, the processing circuitry is included in the integrated circuit.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, by a device, a control signal identifying a first application from among a plurality of compressed applications stored in a non-volatile memory of the device, the first application being stored in a first location; and
   decompressing, by the device, of the first application, the decompressing including storing the decompressed first application into the non-volatile memory at least partially:
      in the first location; and
      in a second location storing a second compressed application among the plurality of applications, the decompressed first application overwriting at least a portion of the second compressed application.

2. The method according to claim 1, wherein the first compressed application comprises a plurality of sections stored at consecutive memory addresses of the first location, and wherein the decompression of the first application includes:
   decompressing a first section located at least partially at an address next to the location of the second compressed application;
   storing the decompressed first section at least partially into the second location storing the second compressed application;
   decompressing a second section of the first application located at least partially at an address next to the first compressed section of the first application; and
   storing the decompressed second section of the first application into at least one address next to the decompressed first section.

3. The method according to claim 1, wherein the control signal identifies a subset of the plurality of compressed applications to be decompressed, the decompressed size of the identified subset of the plurality of compressed applications being at most equal to the size of the memory where the plurality of compressed applications are stored.

4. The method according to claim 3, comprising decompressing the identified subset of compressed applications in an order in which the identified subset of compressed applications are stored in the non-volatile memory of the device.

5. The method according to claim 4, wherein each compressed application of the identified subset of compressed applications is at least partially stored at an address next to a compressed application which does not belong to the identified subset.

6. The method according to claim 3, comprising:
   receiving, by the device, another control signal identifying another subset of the plurality of compressed applications to be decompressed;
   determining whether decompression of the another subset of the plurality of compressed applications is allowed; and
   in response to the determination indicating decompression of the another subset of the plurality of compressed applications is not allowed, generating, by the device, an alert signal indicating the decompression of the another subset is not allowed.

7. The method according to claim 1, comprising:
   storing, under control of a programming device, the plurality of compressed applications into the non-volatile memory; and
   subsequently receiving, by the device, the control signal, the control signal being transmitted by a configuring device.

8. The method of claim 1, wherein,
   the device comprises an integrated circuit including the non-volatile memory, and
   the decompressing is performed during a customization of the integrated circuit.

9. A device, comprising:
   a non-volatile memory; and
   data processing circuitry coupled to the non-volatile memory, wherein the data processing circuitry, in operation:
      responds to a control signal identifying a subset of a plurality of compressed applications stored in the non-volatile memory by decompressing a compressed application of the identified subset, the compressed application being stored in a first location of the non-volatile memory, generating a decompressed application, wherein the decompressing of the compressed application includes storing the decompressed application at least partially:
         into the first location; and
         into a second location of the non-volatile memory storing another compressed application among the plurality of compressed applications.

10. The device according to claim 9, wherein a size of the non-volatile memory is less than a decompressed size of the plurality of compressed applications.

11. The device according to claim 9, wherein the compressed application comprises a plurality of sections stored at consecutive memory addresses of the first location, and wherein the processing circuitry, in operation, decompresses the compressed application by:
   decompressing a first section located at least partially at an address next to the location of the another compressed application;
   storing the decompressed first section at least partially into the second location storing the another compressed application;

decompressing a second section of the compressed application located at least partially at an address next to the first compressed section of the compressed application; and storing the decompressed second section of the compressed application into at least one address next to the decompressed first section.

12. The device according to claim 9, wherein the subset includes two or more compressed applications of the plurality of compressed applications and the decompressed size of the identified subset of the plurality of compressed applications is at most equal to a size of a portion of the non-volatile memory where the plurality of compressed applications are stored.

13. The device according to claim 12, wherein the data processing circuitry, in operation, decompresses the identified subset of compressed applications based on an order in which the identified subset of compressed applications are stored in the non-volatile memory of the device.

14. The device according to claim 13, wherein each compressed application of the identified subset of compressed applications is at least partially stored at an address next to a compressed application of the plurality of compressed applications which does not belong to the identified subset.

15. The device according to claim 12, wherein the data processing circuitry, in operation:
responds to another control signal identifying another subset of the plurality of compressed applications to be decompressed by determining whether decompression of the another subset of the plurality of compressed applications is allowed; and
responds to the determining indicating decompression of the another subset of the plurality of compressed applications is not allowed by generating an alert signal indicating the decompression of the another subset is not allowed.

16. The device according to claim 9, comprising:
an integrated circuit including the non-volatile memory and the data processing circuitry, wherein the data processing circuitry performs the decompressing as part of a process of customizing the integrated circuit.

17. A system, comprising:
an interface; and
an integrated circuit coupled to the interface, the integrated circuit including:
a non-volatile memory storing a plurality of compressed applications in respective locations; and
data processing circuitry coupled to the non-volatile memory, wherein the data processing circuitry, in operation, responds to a customization signal identifying a subset of the plurality of compressed applications stored in the non-volatile memory by decompressing the identified subset of compressed applications, wherein the decompressing of a compressed application of the identified subset includes storing the decompressed application at least partially:
into the respective location of the compressed application; and
into a second location of the non-volatile memory storing a compressed application of the plurality of compressed applications which is not included in the identified subset.

18. The system of claim 17, wherein a size of the non-volatile memory is less than a decompressed size of the plurality of compressed applications.

19. The system of claim 17, wherein the data processing circuitry, in operation:
responds to a second customization signal identifying a second subset of the plurality of compressed applications to be decompressed by determining whether decompression of the second subset of the plurality of compressed applications is allowed; and
responds to the determining indicating decompression of the second subset of the plurality of compressed applications is not allowed by generating an alert signal.

20. A non-transitory computer-readable medium having contents which cause processing circuitry to perform a method, the method comprising:
identifying a subset of a plurality of compressed applications stored in respective locations of a non-volatile memory of an integrated circuit; and
decompressing the identified subset of the plurality of compressed applications, wherein the decompressing of a compressed application of the identified subset includes storing the decompressed application at least partially:
into the respective location storing the compressed application; and
into a second location of the non-volatile memory storing a compressed application of the plurality of compressed applications which is not included in the identified subset.

21. The non-transitory computer-readable medium of claim 20, wherein the contents comprise instructions executed by the processing circuitry.

22. The non-transitory computer-readable medium of claim 20, wherein the processing circuitry is included in the integrated circuit.

* * * * *